(No Model.) 2 Sheets—Sheet 1.

T. HORTON & J. P. WHITEHOUSE.
SOD CUTTER, STALK CUTTER, AND ROLLER.

No. 397,502. Patented Feb. 12, 1889.

Witnesses
M. Fowler
E. G. Siggins

Inventors
Thomas Horton and
Joseph Percy Whitehouse,
By their Attorneys (No Model.) 2 Sheets—Sheet 2.
T. HORTON & J. P. WHITEHOUSE.
SOD CUTTER, STALK CUTTER, AND ROLLER.
No. 397,502. Patented Feb. 12, 1889.
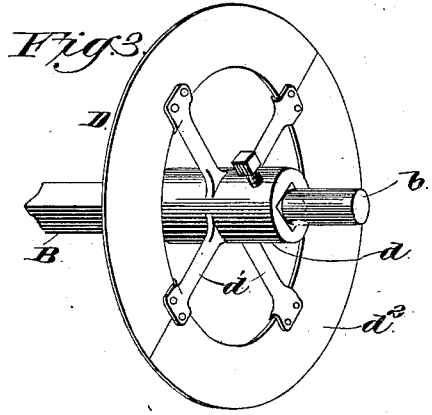
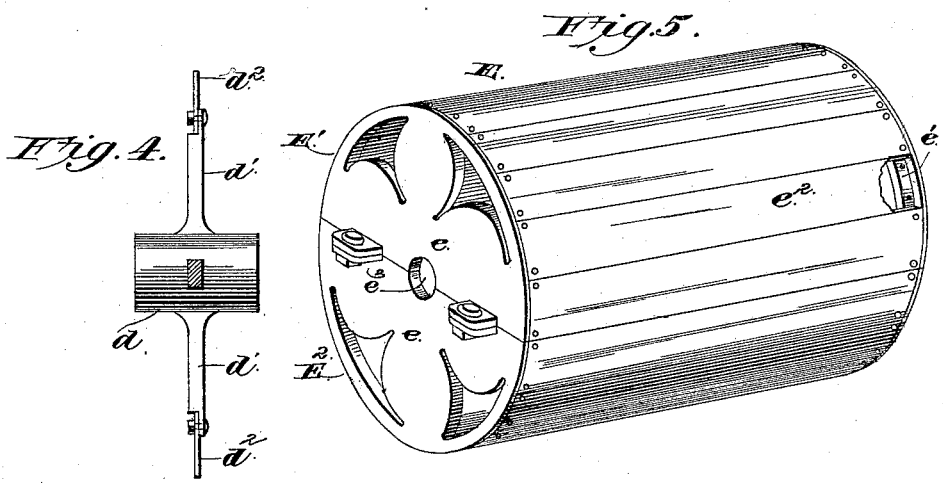
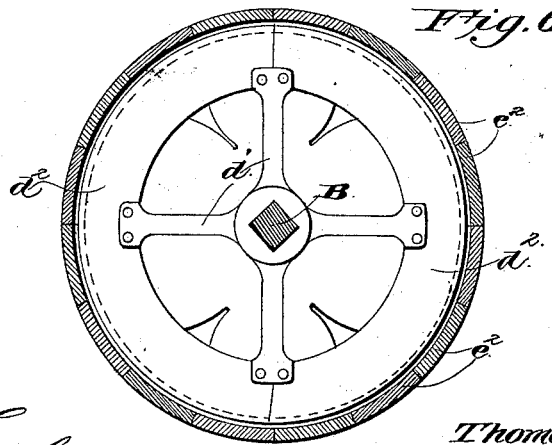
Witnesses:
Inventors,
Thomas Horton and
Joseph Percy Whitehouse
By their Attorneys

UNITED STATES PATENT OFFICE.

THOMAS HORTON AND JOSEPH PERCY WHITEHOUSE, OF GARRETT, ILLINOIS.

SOD-CUTTER, STALK-CUTTER, AND ROLLER.

SPECIFICATION forming part of Letters Patent No. 397,502, dated February 12, 1889.

Application filed May 9, 1888. Serial No. 273,282. (No model.)

*To all whom it may concern:*

Be it known that we, THOMAS HORTON and JOSEPH PERCY WHITEHOUSE, citizens of the United States, residing at Garrett, in the county of Douglas and State of Illinois, have invented new and useful Improvements in a Combined Sod-Cutter, Stalk-Cutter, and Roller, of which the following is a specification.

The invention relates to improvements in combined sod-cutters, stalk-cutters, and rollers.

The object of the invention is the production of a device of simple and comparatively inexpensive construction that will in an efficient and reliable manner cut turf or sod, either before or after the land is broken by a plow; furthermore, the object is to produce a device capable of cutting the stalks of corn in the field after they are broken down, and, finally, the object is to produce a device that may be quickly and conveniently changed from a cutter to a roller, and vice versa.

The invention consists in the novel combination and arrangement of parts hereinafter fully described, illustrated in the accompanying drawings, and pointed out in the claim hereto appended.

Figure 1:
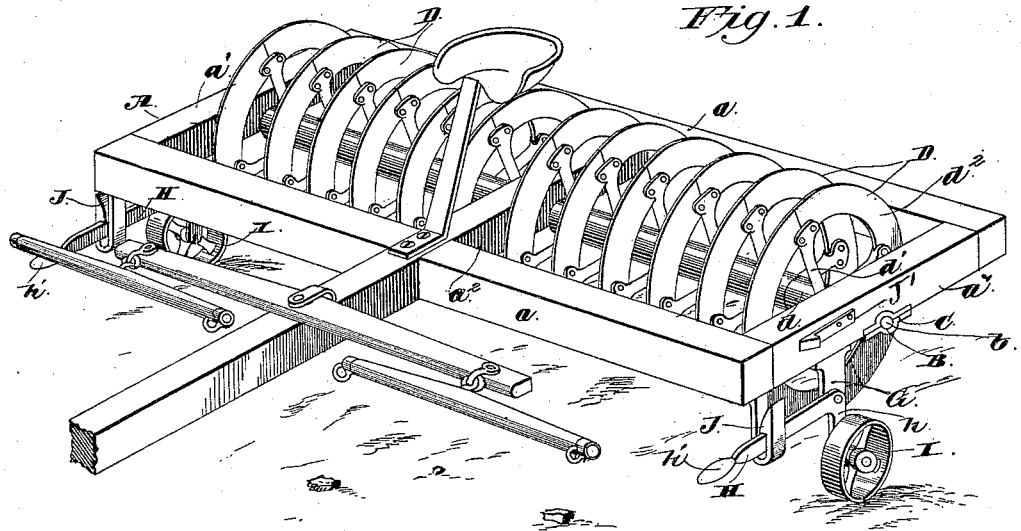
Figure 2:
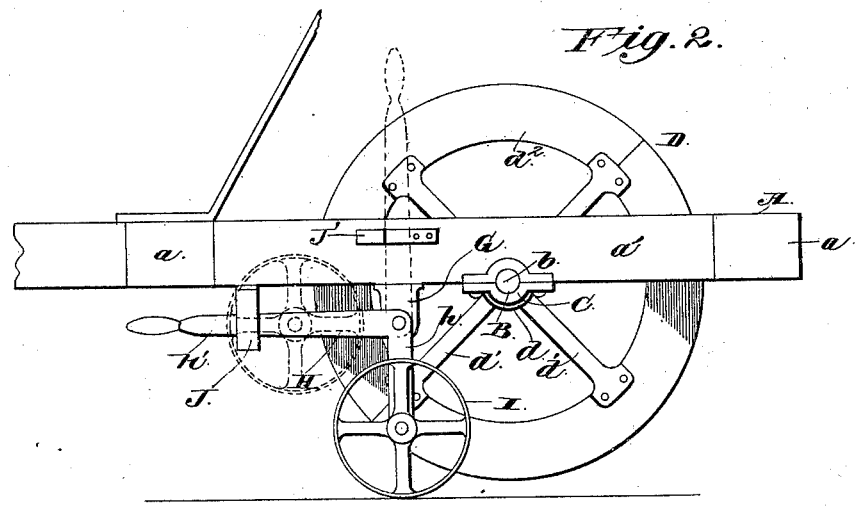

In the accompanying drawings, forming part of this specification, and in which like letters of reference designate corresponding parts, Figure 1 is a perspective view of the improved device, the cutters being in position on the shafts and the device being adapted for cutting turf, sod, or stalks of corn. Fig. 2 is a side elevation of Fig. 1, showing one of the cutter-wheels, and also one of the wheels upon which the device runs when the cutters are not in use, and illustrating in dotted lines the position of the wheel when the device is in condition for cutting. Fig. 3 is a detail perspective view of one of the cutter-wheels and the end of a shaft. Fig. 4 is an edge elevation of the same, illustrating the manner of securing the cutter-blades. Fig. 5 is a perspective view of the roller. Fig. 6 is a transverse section of same.

Referring to the accompanying drawings, A designates the frame, consisting of the side pieces, $a$, the end pieces, $a'$, and the cross-piece $a^2$, which is located in the middle of the frame and divides it in halves, and is extended out beyond the frame in front to form a tongue, to which are attached the horses employed in drawing the device.

Journaled in suitable bearings, C, in the end pieces and cross-pieces $a^2$, are two shafts, B, which are square, except at the ends $b$, which are round, in order to enable the shafts B to be journaled in the bearings C. The shafts B are adapted to receive on them, on each side of the cross-pieces $a^2$, a gang of cutter-wheels, D, or a roller, E. The cutter-wheels D consist of the hubs $d$, the spokes $d'$, and the cutter-blades $d^2$, that are semicircular in form and are secured to the ends of the spokes $d'$, which are rabbeted and adapted for their reception. The hole in the hub $d$ of the cutter-wheels D is made square in order to conform to the configuration of the shafts B, on which they are placed. A gang of cutter-wheels, which may be of any desired number, is provided on each side of the cross-piece $a^2$, and to retain them in place on the shafts B the end ones of the series are provided with a set-screw, which passes through the hubs of the cutter-wheel and takes upon the shafts B, thereby securing the cutter-wheels rigidly to the shafts, and at the same time preventing the other cutter-wheels moving laterally on the shaft. By this construction each gang of cutters, being mounted in separate shafts, acts independently, which is very advantageous in turning the device.

In order to keep the cutter-wheels D from the ground when not in use, and also to regulate the depth of their cutting, each of the ends of the frame A is provided on its under side with a standard, G, having pivotally connected thereto an L-shaped lever, H, carrying on its end $h$ a wheel, I. When it is desired to raise the cutter-wheels D from the ground, the lever H is lowered by its handle $h'$ from a catch, J', thereby bringing the wheel I to the ground and causing the device to rest upon it. To keep the lever H in this position, a catch, J, is provided on the corner of the frame A, and it engages the lever H and holds it. The lever H may only partially be lowered, in order to regulate the depth that the blades of the cutter-wheels enter the ground.

To change the cutter into a land-roller, the device is provided with two drums or rollers, E, which consist of two semi-cylindrical shells, E' and E², that are fitted over the cutter-wheels and secured together by bolts, one drum or roller E being provided for each gang of cutter-wheels. These drums or rollers are constructed of four semicircular head-pieces, $e$, made of cast-iron or other suitable material and provided on the side of their outer edges or peripheries with grooves $e'$, into which are set planks or boards $e^2$, which connect the head-pieces, and with them form the roller E. Each head-piece $e$ is provided on its straight edge with a semicircular groove, which, when two head-pieces are put together, form a central opening, $e^3$, which is of suitable size to fit around the hub $d$ of the cutter-wheel at the end of a gang, and the end pieces are securely fastened to the hub $d$ by bolts or the like.

The insides of the rollers E are a little larger in diameter than the cutter-wheels D, so that when the head-pieces of the rollers are fitted in place on the end hubs of the cutter-wheels, the wheels being of less diameter than the inside of the rollers, the blades will not come in contact with the roller.

From the foregoing description and the accompanying drawings the construction, operation, and advantages of the invention will be readily understood.

It will be clearly seen that the combined sod-cutters, stalk-cutters, and rollers made in accordance with this invention are of economical and uncomplicated construction, positive and reliable in their operation, and may readily and conveniently be changed from cutters to rollers, and vice versa.

Having thus fully described the invention, what we claim as new, and desire to secure by Letters Patent, is—

The combination of the frame A, the shafts journaled therein, the series of cutters secured on said shafts, and the drums secured on said shafts and covering the cutters, said drums consisting of the semicircular heads $e$, having the grooves $e'$, and the boards $e^2$, having their ends secured in said grooves, as set forth.

In testimony that we claim the foregoing as our own we have hereto affixed our signatures in presence of two witnesses.

THOMAS HORTON.
J. PERCY WHITEHOUSE.

Witnesses:
WILLIAM S. COX,
H. E. CONOVER.